(12) United States Patent
Betageri

(10) Patent No.: US 12,284,488 B2
(45) Date of Patent: *Apr. 22, 2025

(54) COMPUTER PROGRAM PRODUCT

(71) Applicant: Sivantos Pte. Ltd., Singapore (SG)

(72) Inventor: Renuka Betageri, Nuremberg (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,008

(22) Filed: Nov. 30, 2023

(65) Prior Publication Data

US 2024/0098431 A1 Mar. 21, 2024

Related U.S. Application Data

(63) Continuation of application No. 17/523,598, filed on Nov. 10, 2021, now Pat. No. 11,889,270.

(30) Foreign Application Priority Data

Nov. 27, 2020 (DE) ...................... 10 2020 214 914.3

(51) Int. Cl.
*H04R 25/00* (2006.01)
*G06F 21/62* (2013.01)
*H04W 4/021* (2018.01)
*H04W 12/63* (2021.01)

(52) U.S. Cl.
CPC ......... *H04R 25/554* (2013.01); *G06F 21/629* (2013.01); *H04W 4/021* (2013.01); *H04W 12/63* (2021.01); *H04R 2225/55* (2013.01)

(58) Field of Classification Search
CPC .......................... H04R 25/554; H04R 2460/07
See application file for complete search history.

(56) References Cited

U.S. PATENT DOCUMENTS

| 8,718,288 | B2 | 5/2014 | Woods et al. |
| 8,866,586 | B2 | 10/2014 | Hayashi |
| 9,516,439 | B2 | 12/2016 | Westergaard et al. |
| 10,057,694 | B2 | 8/2018 | Pedersen et al. |

(Continued)

FOREIGN PATENT DOCUMENTS

| CH | 709679 A2 | 12/2015 |
| CN | 106331970 A | 1/2017 |

(Continued)

OTHER PUBLICATIONS

DE 11 2018 006107 T5. English Translation (Year: 2020).

*Primary Examiner* — Phylesha Dabney
(74) *Attorney, Agent, or Firm* — Laurence A. Greenberg; Werner H. Stemer; Ralph E. Locher

(57) ABSTRACT

A computer program product and a hearing aid system for supporting a user of a hearing aid include individually adapting the hearing aid to the user in a first fitting session held in particular in the home country of the user and generating adaptation data during the first fitting session. The adaptation data is assigned to the user or to the hearing aid and stored in such a way that access to the adaptation data is restricted by an access restriction. A visit to a foreign country is automatically detected and a request is issued to the user to ascertain whether the access restriction should be changed when a visit to a foreign country is automatically detected.

9 Claims, 1 Drawing Sheet

(56) References Cited

U.S. PATENT DOCUMENTS

| | | | |
|---|---|---|---|
| 10,652,671 B2 | 5/2020 | Meier et al. | |
| 10,729,587 B2 | 8/2020 | Gustavsson et al. | |
| 2014/0211972 A1 | 7/2014 | Kim et al. | |
| 2018/0063653 A1 | 3/2018 | Aschoff | |
| 2019/0335318 A1* | 10/2019 | Vagelos | ................ H04W 8/183 |

FOREIGN PATENT DOCUMENTS

| | | | | |
|---|---|---|---|---|
| CN | 108370479 A | 8/2018 | | |
| CN | 109152663 A | 1/2019 | | |
| DE | 102016216054 A1 | 3/2018 | | |
| DE | 112018006107 T5 | 8/2020 | ........... | H04R 25/405 |
| EP | 1868132 A1 | 12/2007 | | |
| EP | 2071875 A2 | 6/2009 | | |
| EP | 1582958 B1 | 12/2013 | | |
| EP | 2876899 A1 | 5/2015 | | |
| EP | 3432606 A1 | 1/2019 | | |
| KR | 20170009062 A | 1/2017 | | |
| WO | 2014094866 A1 | 6/2014 | | |

\* cited by examiner

COMPUTER PROGRAM PRODUCT

CROSS-REFERENCE TO RELATED APPLICATION

This application is a Continuation of allowed U.S. patent application Ser. No. 17/523,598, filed Nov. 10, 2021; which claimed the priority, under 35 U.S.C. § 119, of German Patent Application DE 10 2020 214 914.3, filed Nov. 27, 2020; the prior applications are herewith incorporated by reference in their entirety.

FIELD AND BACKGROUND OF THE INVENTION

The invention relates to a method for supporting a user of a hearing aid. The invention additionally relates to a hearing aid and to a computer program product.

The term hearing aids is typically used to refer to classical hearing aid devices, which are used to treat hearing impaired people. In the broader sense, however, that term also refers to devices configured to support people with normal hearing. Hearing aids for supporting people with normal hearing are also referred to as "Personal sound amplification products" or "Personal sound amplification devices" (or "PSAD" for short). In contrast to classical hearing aids, such hearing aids are not intended to compensate for hearing loss, but are specifically used to support and improve the normal human hearing capacity in specific hearing situations, e.g. to support wildlife observation to allow better perception of animal calls and other sounds produced by animals, to support hunters when hunting, for sports reporters to enable improved speech and/or speech comprehension in complex noise backgrounds, for musicians to reduce the stress on their hearing, etc.

Regardless of the intended purpose, hearing aids usually include at least one input transducer, a signal processing device, and an output transducer as necessary components. The at least one input transducer is usually formed by an acousto-electric transducer, for example by a microphone, or by an electromagnetic receiver, for example an induction coil. In many cases, there is even more than one input transducer, for example one or more acousto-electric transducers and an electromagnetic receiver. The output transducer used is usually an electro-acoustic transducer, for example a miniature loudspeaker (also referred to as a "receiver"), or an electromechanical transducer such as a bone conduction receiver. The signal processing device is usually realized by an electronic circuit implemented on a printed circuit board and, independently of this, usually includes an amplifier.

In addition, hearing aids are often equipped with a transceiver unit that enables wireless communication with other electronic devices, in particular with other hearing aids (e.g. to form a binaural hearing device system or hearing aid system), with remote controls, with programming devices, with mobile phones or smartphones. The wireless communication typically takes place by using electromagnetic waves in the radio frequency range from 500 kHz to 5 GHz, for example in the frequency range from 1 MHz to 50 MHz, or using Bluetooth technology at around 2.4 GHz, for example.

When a user purchases such a hearing aid for personal use, the hearing aid is often adapted to the user's individual needs and/or configured according to the user's wishes in a so-called fitting session, by a specialist, typically a hearing aid specialist. That first fitting session is usually held in the user's home country, one reason being that, as a rule, an exchange of information between the user and the specialist is necessary for the individual adaptation or configuration of the hearing aid, and for most people that exchange of information is easier if the mother tongue can be used.

In addition, further fitting sessions are usually required over time, in which maintenance work is carried out, for example. Such further fitting sessions may also be necessary, for example, if the user is currently staying outside of their home country. That raises a specific problem in cases where the user does not know or has insufficient knowledge of the language of the country they are currently visiting to be able to exchange information relevant to the further fitting session with a local specialist.

SUMMARY OF THE INVENTION

It is accordingly an object of the invention to provide a computer program product and a hearing aid system, which overcome the hereinafore-mentioned disadvantages of the heretofore-known products and systems of this general type.

With the foregoing and other objects in view there is provided, in accordance with the invention, a non-transitory computer program product containing a program that when executed on a mobile data processing unit after starting, automatically executes at least the following steps of a method:
  automatically detecting a visit to a foreign country; and
  issuing a request to a user to ascertain whether an access restriction should be changed upon automatically detecting the visit to the foreign country.

With the foregoing and other objects in view there is further provided, in accordance with the invention, a method for supporting a user of a hearing aid, wherein:
  the hearing aid is individually adapted to the user in a first fitting session, which is held in particular in the home country of the user,
  adaptation data is generated during the first fitting session,
  the adaptation data is assigned to the user or to the hearing aid and stored in such a way that access to the adaptation data is restricted by an access restriction,
  a visit to a foreign country is automatically detected, and
  a request is issued to the user to ascertain whether the access restriction should be changed when a visit to a foreign country is automatically detected.

With the objects of the invention in view, there is additionally provided a hearing aid system, comprising a mobile data processing unit configured to carry out at least the following steps:
  automatically detecting a visit to a foreign country; and
  issuing a request to a user to ascertain whether an access restriction should be changed upon automatically detecting the visit to the foreign country.

With the objects of the invention in view, there is also provided a hearing aid configured to execute at least one step of the method and a computer program product containing a program that can be executed on a mobile data processing unit which, after starting, automatically executes at least one step of the method.

Preferred extensions are specified in the cross-referenced claims. The advantages and preferred embodiments cited in relation to the method are also applicable mutatis mutandis to the hearing aid and/or the computer program product and vice versa.

The method according to the invention is configured to support a user of a hearing aid. The term hearing aid stands for both a single hearing aid as well as a hearing aid system with two hearing aids, namely with one hearing aid for the left ear and one hearing aid for the right ear, for example for a so-called binaural hearing aid system.

Irrespective of this, the hearing aid is typically configured according to a hearing aid of the type described at the outset, and in particular as a classical hearing aid for a hearing impaired user.

In the course of the method, the hearing aid is individually adapted to the user and/or configured according to the user's wishes in a first fitting session which is preferably held in the user's home country or where the user resides or is located. The corresponding adaptation or configuration is typically performed by a service provider, in particular a specialist who is trained to adapt hearing aids to a user's individual needs, i.e. to adapt them to a user's individual hearing loss, and/or to maintain or repair hearing aids. Such a specialist usually belongs to a group of professions which includes, for example, audiologists, hearing aid acousticians, or hearing systems specialists, where in some cases the names reflect a specialization.

Furthermore, in the course of the method, during the first fitting session and in some cases also during further fitting sessions, adaptation data will be generated either at the service provider of the first fitting session or at least at a service provider in the home country. This will typically be data on the basis of which the individual adaptation of the hearing aid to the user can be traced, i.e. through the use of which in particular the individual adaptation of the hearing aid can also be reproduced. Alternatively or in addition, the adaptation data contains information on the language that the user prefers, information on the previous usage history of the hearing aid, information on any problems that have occurred in the past, information on solutions to problems that have occurred in the past, etc.

Such adaptation data is assigned to the user and/or the hearing aid and stored, for example, at the end of the first fitting session or a further above-mentioned fitting session, in such a way that access to the adaptation data is restricted by an access restriction. The type of access restriction varies depending on the application. Typically, however, a form of access restriction is used in which access data such as an access code or password is required in order to access the adaptation data.

The user's adaptation data is then stored, for example, in an access-restricted database which can be accessed by using the access data and in which adaptation data for a plurality of users and/or hearing aids is stored. Alternatively, the access restriction is of such a form that a dataset containing the adaptation data is stored for each user and/or for each hearing aid, and that separate access data uniquely assigned to the dataset is required for each dataset. Thus, appropriate access data only allows access to the adaptation data assigned to a very specific user and/or a very specific hearing aid.

Furthermore, during the course of the method, a period of time spent, i.e. typically by the user, in a foreign country is automatically detected. For the purposes of this application, the term foreign country refers primarily to a country of which the user is not a citizen and/or in which the user is not normally resident. In the broader sense, however, the term foreign country also stands for a region in which the majority of the population speaks a language which does not correspond to the language of the majority of the population in the region in which the user lives. It should be borne in mind that in some countries, such as India, different languages are spoken in different regions although all regions belong to the same country.

If the visit to the foreign country is automatically detected, in the course of the method a request to ascertain whether the access restriction should be changed is issued to the user. For example, the request is issued by the hearing aid itself, for example, by issuing a suitable voice message. Depending on the individual application, the visit to the foreign country is also detected automatically by the hearing aid itself.

However, the method is preferably executed by using a mobile data processing unit, which is configured as a smartphone, tablet or laptop, for example. In this case, the request is then preferably output by a display, wherein depending on the individual application, an acoustic output of the request is also provided.

After the request has been issued, the user has the option to agree to change the access restriction or to refuse to do so. The user usually makes the choice by data input, for example as a voice input by a microphone or as an input by a keyboard or a touch screen. If no mobile data processing unit is provided, the input is typically made as a voice input by a microphone, in particular, a microphone of the hearing aid.

If the user decides not to adjust or change the access restriction, no further method step is preferably carried out. On the other hand, if the user opts to change the access restriction and if an appropriate input is made by the user, the access restriction is then typically changed, preferably automatically. For this purpose, for example, the hearing aid or the mobile data processing unit transmits a change instruction to the location where the user's adaptation data is stored. Depending on the particular application, the change instruction involves, for example, a message to the service provider of the first fitting session by SMS or e-mail, or a kind of command or command code that initiates an automatic change. A corresponding change in the access restriction typically then activates or enables a kind of roaming service, through the use of which the adaptation data is made accessible to an extended group of people, in particular for use during a further fitting session.

As stated above, the method involves an automatic detection of the visit to the foreign country. According to one structural variant, the visit to the foreign country is automatically detected by using GPS data (GPS: Global Positioning System) or comparable data, and in this case the hearing aid and/or the mobile data processing unit advantageously includes a receiver for GPS data or for the comparable data.

Alternatively or in addition, the visit to the foreign country is detected by using a communication network, for example, by using a mobile radio network and/or by using a WLAN, wherein the WLAN is based on the IEEE 802.11 standard, for example, and if necessary is assigned a Wi-Fi certification. This means that, for example, the visit to the foreign country is automatically detected if the mobile computing device described above, which is in the form of a smartphone, for example, connects to a mobile radio network of a foreign country, or at least if the corresponding mobile computing device detects such a mobile radio network.

It is also convenient if the visit to the foreign country is automatically detected by using a so-called SIM card (SIM: Subscriber Identity Module), for example, if the smartphone described above recognizes a SIM card of a mobile radio network of the foreign country or if such a SIM card is activated. It is important to remember that it is not unusual to purchase a SIM card for a visit abroad, for example during a business trip or a holiday, to be able to use a mobile network in the foreign country. For example, the visit to the foreign country is automatically detected when a corresponding SIM card is inserted into the smartphone, for example, and the smartphone is then immediately switched on again.

As previously stated, according to a preferred structural variant the request to the user to ascertain whether the access restriction should be changed is output by a display, in particular if the request is issued by the above-mentioned mobile data processing unit. Depending on the application, the request is also issued in such a way that the user has a number of possible ways to respond to the request. In the simplest case, the user is given the option either to refuse the request or to agree to the request. As an alternative, the request specifies a plurality of, i.e. more than two, ways to respond to the request. According to one structural variant, the user is offered two different variants for changing the access restriction, in particular in addition to the option of refusing the request and thus refusing to change the access restriction.

Also advantageous is a variant of the method in which the request to the user to ascertain whether the access restriction should be changed is only issued when a second fitting session is identified as pending. This means that in this case, two conditions must be satisfied before a corresponding request is issued. One condition is then that a second fitting session is identified as pending, and the second condition is then that the visit to the foreign country is detected.

A second fitting session is identified as pending, for example, if an appointment for a fitting session is entered or stored in the mobile data processing unit, and a specified time is reached at which a reminder of the appointment is provided.

Alternatively or in addition, a second fitting session is identified as pending if the user, preferably using the mobile data processing unit, starts a search for service providers, in particular service providers of the kind described above with a specialist from the previously described group of professions, who offers fittings and/or maintenance and/or repairs of hearing aids as a service.

Again alternatively or additionally, a second fitting session is identified as pending if an error message is present in the hearing aid and/or if an error message is transmitted from the hearing aid to the mobile data processing unit.

In addition, as already mentioned, in the case of many method variants, the mobile data processing unit described above is used to assist in executing the method according to the invention. In these cases, the automatic detection of the visit to the foreign country is preferably carried out by the mobile data processing unit and, more preferably, the request to the user to ascertain whether the access restriction should be changed is output by a display of the mobile data processing unit. In addition, in these cases, it is common for the hearing aid and the mobile data processing unit to be at least intermittently coupled during the method, so that data transfer from the hearing aid to the mobile data processing unit and/or from the mobile data processing unit to the hearing aid is possible. Using such a coupling or during such a coupling, for example, an error message can be transferred from the hearing aid to the mobile data processing unit as previously described, or a fault memory in the hearing aid can be read out by the mobile data processing unit.

It is also advantageous if identification data is transmitted that identifies the hearing aid during such a coupling between the hearing aid and the mobile data processing unit. If the user then agrees to a change in the access restriction in the course of the method, this identification data is typically used to perform a change in the access restriction, for example by sending an instruction for changing the access data to the location where the adaptation data is stored, wherein in this case, the instruction preferably contains the identification data.

Depending on the application, it is also advantageous if, in the event that the user agrees to change the access restriction, the access restriction is changed by generating access data and, for example, transmitting it to a third party. This means that, for example, an access code or password is generated.

This access code is then displayed on the display of the mobile data processing unit, for example, and can then be shown to a previously mentioned service provider. Alternatively, a corresponding password is generated and transmitted electronically to a selected service provider or a number of selected service providers, for example, by SMS, e-mail, or other message type. Regardless of the form in which the access data is transmitted to the third party, the validity period of the access data is typically limited. This means that the access data can only be used for a specified limited period which is defined by the user, for example, to query the adaptation data. Once the validity period has expired, the adaptation data can no longer be queried using this set of access data.

The third party mentioned above is either a single person, a single service provider, or a group of service providers, depending on the application. In accordance with a variant of the method, the third party is all service providers of the type described above who operate in the foreign country and offer their services in the foreign country accordingly. As an alternative, these are all service providers of the type described above in the foreign country as well as all service providers of the type described above in the countries directly bordering the foreign country. Alternatively again, it includes all service providers of the type described above worldwide.

The hearing aid is typically a specific hearing aid model or a specific hearing aid type from a specific manufacturer. Therefore, it is advantageous if the third party is only those service providers of the type described above in the foreign country that offer services for hearing aids of the specific hearing aid manufacturer and/or offer services for the corresponding specific hearing aid model or hearing aid type from the specific hearing aid manufacturer. The corresponding service providers are then effectively specialized in hearing aids of the respective manufacturer or even in hearing aids of the specific hearing aid model or the specific hearing aid type. For the purposes of this application, specialized means that the corresponding service providers have specific specialist knowledge and/or specific equipment for hearing aids of the respective manufacturer and/or the respective hearing aid model or the specific hearing aid type.

It is also advantageous if in the course of the method a return to the user's home country is automatically detected and if a request is made to the user to ascertain whether the access restriction should be rescinded or changed again when the return to the home country is automatically detected. If the user then agrees to rescind or make another change to the access restrictions, the access restriction will be changed or rescinded again, for example by withdrawing the validity of the previously issued access data.

A hearing aid according to the invention is configured to execute at least one method step of the previously described method in at least one operating mode. For this purpose, the hearing aid preferably includes a transceiver unit mentioned earlier for exchanging data with a previously mentioned mobile data processing unit. The exchange of data is then preferably carried out with the aid of a computer program product according to the invention.

A computer program product according to the invention, in turn, contains a program that can be executed on the above-mentioned mobile data processing unit, which after starting, automatically executes at least one method step of the previously described method. A corresponding program can also be installed or stored retrospectively by using a computer program product according to the invention. The computer program product is typically a file or data medium containing a file, wherein the file contains the executable program, in particular a suitable program code.

Other features which are considered as characteristic for the invention are set forth in the appended claims.

Although the invention is illustrated and described herein as embodied in a method for supporting a hearing aid user, a hearing aid and a computer program product, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
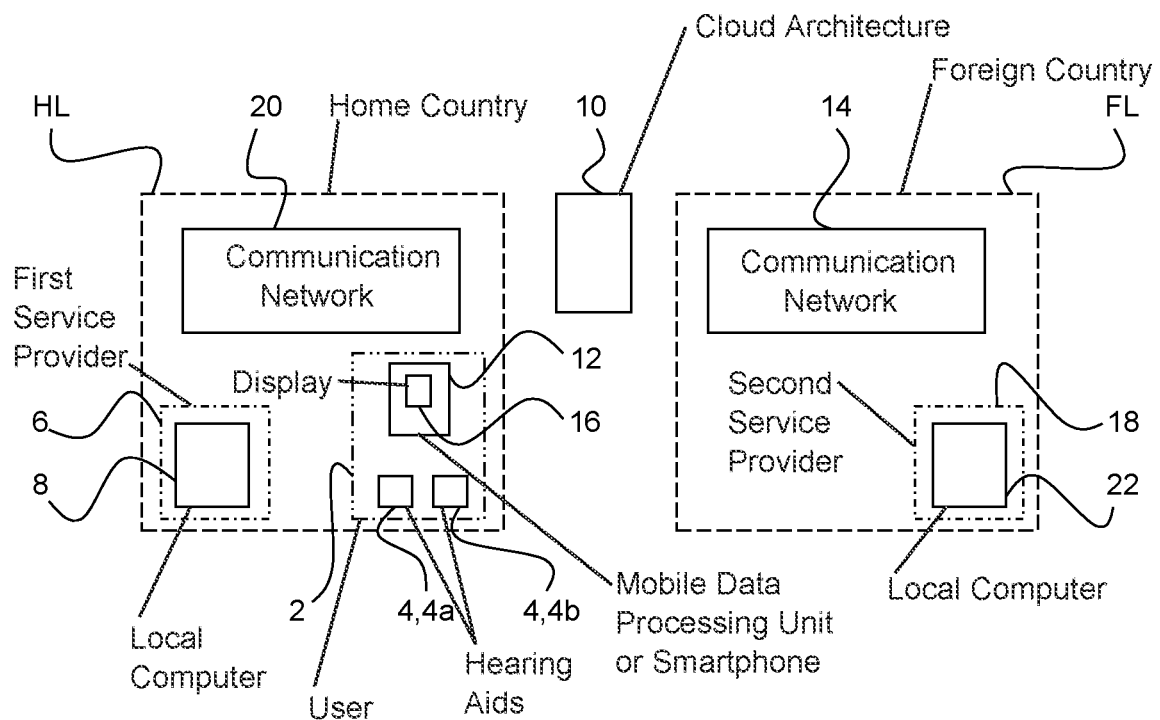
FIG. 1 is a block diagram showing a user with a hearing aid during a first fitting session with a first service provider in the user's home country.
Figure 2:
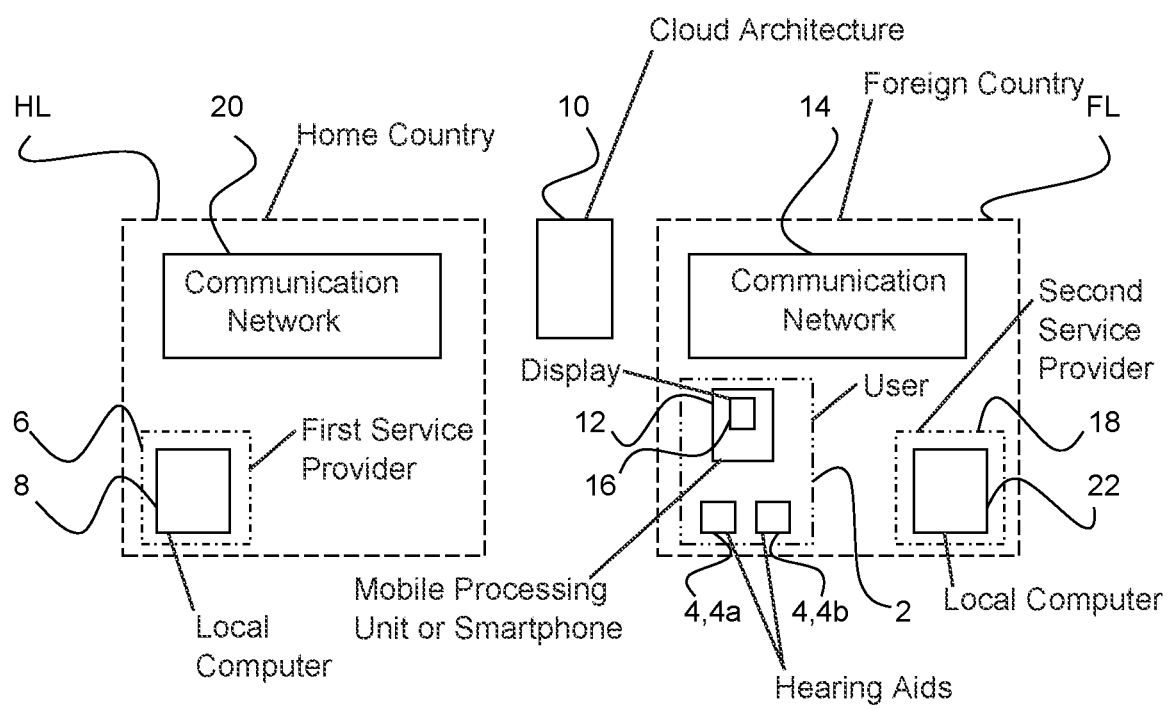
FIG. 2 is a block diagram showing the user with the hearing aid during a second fitting session with a second service provider in a foreign country.

Referring now in detail to the figures of the drawings as a whole, in which equivalent parts are provided with the same reference symbols, there is seen an example of a method described below which is intended to support a user 2 of a hearing aid 4. The term hearing aid 4 as used in the following stands for a hearing aid system with two hearing aids 4a, 4b, namely one hearing aid 4a for the left ear of the user 2 and one hearing aid 4b for the right ear of the user 2.

In the course of the method, the hearing aid 4 is then individually adapted to the user 2 in a first fitting session. This situation is shown in FIG. 1. In particular, if the hearing aid 4 is a classical hearing aid, it will typically be adapted to an individual hearing loss of the user 2, wherein for example an audiogram is used as a basis for the individual adaptation of the hearing aid 4 to the user 2.

Irrespective of this, the first fitting session takes place for example at a first service provider 6 who has specialist knowledge of hearing aids, for example at the premises of a hearing aid specialist. In addition, the first fitting session in the exemplary embodiment is held in the home country HL of the user 2, i.e. in the country or state in which the user 2 is resident and/or of which the user 2 has citizenship.

Furthermore, during the first fitting session and thus in the course of the method, adaptation data is generated, through the use of which the individual adaptation of the hearing aid 4 to the user 2 can be traced. Some of this adaptation data is, for example, parameter values which are specified for the hearing aid 4 and, as a function of these, for example, input signals are amplified by the hearing aid 4.

This adaptation data is then stored in the course of the method and typically in such a way that the adaptation data is assigned to the user 2 and/or the hearing aid 4. In addition, the adaptation data is preferably stored in such a way that access to the adaptation data is restricted by an access restriction.

Depending on the application, the corresponding access restriction is, for example, in such a form that the adaptation data is stored on a local computer 8 or local server at the first service provider 6, and that the adaptation data can only be retrieved locally at the first service provider 6. Alternatively, the access restriction is in such a form that the adaptation data is stored on a server that is not located at the first service provider 6 and, in particular, in a so-called cloud architecture 10, namely in a password-protected dataset, in a password-protected level of the cloud architecture, or in a password-protected database.

Furthermore, during the course of the method, a visit to a foreign country FL is automatically detected and a request is issued to the user 2 to ascertain whether the access restriction should be changed when the visit to the foreign country FL is automatically detected. Depending on the structural variant, the visit to the foreign country FL is automatically detected by the hearing aid 4 or a mobile data processing unit. The mobile data processing unit in this case is configured as a smartphone 12, tablet or laptop, for example.

Regardless of whether the residence in the foreign country FL is automatically detected by the hearing aid 4 or the above-mentioned mobile data processing unit, according to one structural variant the automatic detection is carried out by using GPS data, and in this case the hearing aid 4 or the mobile data processing unit typically includes a GPS receiver. This means that in this case the hearing aid or the mobile data processing unit is then configured to receive GPS data and, in particular, also to process and/or evaluate it.

Alternatively or in addition, the visit to the foreign country FL is automatically detected by using a communication network 14 in the foreign country FL. A corresponding communication network 14, for example, is configured as a mobile radio network or as a so-called WLAN. The visit to the foreign country FL is typically detected automatically when a signal from the communication network 14 is received or when a connection is established to the communication network 14 and the communication network 14 is recognized as a communication network 14 of the foreign country FL.

According to another structural variant, the visit to the foreign country FL is automatically detected by using a so-called SIM card. This applies in particular if the automatic detection is carried out by the above-mentioned mobile data processing unit.

If, in the course of the method, the visit to the foreign country FL is then automatically detected, then as a consequence, as a kind of response to it, the request to ascertain whether the access restriction should be changed is issued to the user 2, either by the hearing aid 4 or by the mobile data processing unit. If the request is issued by the mobile data processing unit or by using the mobile data processing unit, the request is preferably output by a display unit or a display 16 of the mobile data processing unit, in particular as a kind of text message.

In particular if the above-mentioned computing device is used to execute the method, in a typical structural variant the method is executed by using a computer program product which usually includes an app, i.e. a program that can be executed on the mobile data processing unit. The app typically runs in the background as long as the mobile computing device is in operation.

If the visit to the foreign country FL is then detected automatically, a window with a text message is opened in the display 16, for example, wherein the text message contains the request as to whether the access restriction should be changed. The request is usually generated by the above-mentioned app. Alternatively, the request is sent to the above-mentioned data processing unit, for example by SMS or e-mail.

In addition, a number of choices is then preferably offered to the user 2 in the window, from which they can select by providing an input, for example by using the display 16, assuming this is configured as a touch screen. In the simplest case, two choices are offered, namely, to agree to change the access restriction or to refuse the change. Alternatively, the user 2 is offered the option of either rejecting a change or selecting from a number of different changes to the access restriction.

Changing the access restriction will then extend the group of people who have access to the adaptation data. Through their input, the user 2 decides whether to extend the group of people and, in addition, preferably which other persons or other service providers will obtain access. This means that, for example, a specific input will result in access being granted to a second service provider 18, which offers its services in the foreign country FL.

For this purpose, for example, the adaptation data is copied or transferred from the local computer 8 or local server at the first service provider 6 to the cloud architecture 10 by the communication network 20. The transfer is initiated by the first service provider 6, in which case as a result of the specific input of the user 2 the first service provider 6 automatically receives a change instruction, for example by SMS or e-mail, or else it takes place completely automatically as a result of the specific input by the user 2. If the adaptation data is already present in the cloud architecture 10, for example in a password-protected data set or in a password-protected layer of the cloud architecture 10, the adaptation data is moved or copied to another layer of the cloud architecture 10, for example, to which the second service provider 18 has access, or the second service provider 18 receives access data that allows access, in particular a password. In the second case as well, the change is made either by using the first service provider 6, in which case the first service provider 6 will again automatically receive a change instruction as a result of the specific input by the user 2, for example by SMS or e-mail, or completely automatically as a result of the specific input by the user 2.

Depending on the application, the user 2 is notified every time a change to the access restriction has been made. The notification takes place, for example, by app message, by SMS or by e-mail, and preferably automatically. It serves as a confirmation for the user 2.

As explained above, it is preferably provided that the user 2 also decides which other persons or other service providers will have access to the adaptation data as a result of the change to the access restriction. For example, the user 2 selects one or more service providers from a range of suitable service providers. For example, a corresponding selection is automatically filtered out from a database based on specifications by the user 2 and displayed to the user 2, for example, on the display 16. Alternatively, the selection reflects service providers who offer their services at the request of the user 2, for example a request in a portal, i.e. who have in particular answered a request from the user 2.

If a change in the access restriction has now taken place, through which, for example, the second service provider 18 has obtained access to the adaptation data, this will advantageously be followed by a fitting session with the second service provider 18 in the foreign country FL, or at least a fitting session by the second service provider 18. In the second case, for the fitting session, the user 2 or the second service provider 18 establishes a communication link between the hearing aid 4 and/or the mobile data processing unit 12 and a local computer 22 at the second service provider 18. The second service provider 18 then uses the adaptation data.

It is also advantageous if, in the course of the method, a return to the home country HL of the user 2 is automatically detected and if a request is issued to the user 2 to ascertain whether the access restriction should be rescinded or changed again when the return to the home country HL is automatically detected. If the user 2 then agrees to rescind or make a new change to the access restrictions, the access restriction will be changed or rescinded again, for example by withdrawing the validity of the previously issued access data or by the adaptation data, which may have been changed or extended by the second service provider 16 during the fitting session, being moved back to the local computer 8 of the first service provider 6 and/or deleted in the cloud architecture 10. The process of automatic detection is similar to the detection of the visit to the foreign country FL, for example by connecting the mobile data processing unit to a mobile radio network in the home country HL.

The following is a summary list of reference numerals and the corresponding structure used in the above description of the invention:

2 user
4 hearing aid/hearing aid system
4a hearing aid for left ear
4b hearing aid for right ear
6 first service provider (in the home country)
8 local computer (of the first service provider)
10 cloud architecture
12 smartphone
14 communication network (in the foreign country)
16 display (of the smartphone)
18 second service provider (in the foreign country)
20 communication network (in the home country)
22 local computer (of the second service provider)
HL home country
FL foreign country

The invention claimed is:

1. A non-transitory computer program product containing a program that when executed on a mobile data processing unit after starting, automatically executes at least the following steps of a method:
  automatically detecting a visit to a foreign country;
  issuing a request to a user to ascertain whether an access restriction should be changed upon automatically detecting the visit to the foreign country; and
  transmitting a change instruction to change the access restriction to a storage location of adaptation data of the user when the user opts to change the access restriction and when an appropriate input is made by the user, the storage location of the adaptation data of the user being a local computer or a local server or a cloud architecture.

2. The non-transitory computer program product according to claim 1, which further automatically executes a step of automatically detecting the visit to the foreign country by using GPS data.

3. The non-transitory computer program product according to claim 1, which further automatically executes a step of automatically detecting the visit to the foreign country by using a communication network or a mobile radio network or a WLAN.

4. The non-transitory computer program product according to claim 1, which further automatically executes a step of automatically detecting the visit to the foreign country by using a SIM card.

5. The non-transitory computer program product according to claim 1, which further automatically executes a step of using the mobile data processing unit to issue the request to the user to ascertain whether the access restriction should be changed.

6. The non-transitory computer program product according to claim 1, which further automatically executes a step of using a display to issue the request to the user.

7. The non-transitory computer program product according to claim 1, which further automatically executes a step of issuing the request to the user to ascertain whether the access restriction should be changed only when a fitting session for a hearing aid is identified as pending.

8. The non-transitory computer program product according to claim 7, which further automatically executes a step of identifying the fitting session as pending when an error message is transmitted from the hearing aid to the mobile data processing unit.

9. The non-transitory computer program product according to claim 7, which further automatically executes a step of changing the access restriction by generating access data and transmitting the access data to a third party, when the user agrees to change the access restriction.

\* \* \* \* \*